(12) United States Patent
Frappe et al.

(10) Patent No.: US 11,509,252 B2
(45) Date of Patent: Nov. 22, 2022

(54) MANAGEMENT OF THE NUMBER OF ACTIVE POWER CELLS OF A VARIABLE SPEED DRIVE

(71) Applicant: Schneider Toshiba Inverter Europe SAS, Pacy sur Eure (FR)

(72) Inventors: Emmanuel Frappe, Boulogne Billancourt (FR); François Malrait, Jouy sur Eure (FR); Thomas Devos, Carrières sous Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 237 days.

(21) Appl. No.: 16/711,817

(22) Filed: Dec. 12, 2019

(65) Prior Publication Data

US 2020/0195188 A1 Jun. 18, 2020

(30) Foreign Application Priority Data

Dec. 14, 2018 (FR) ...................................... 1872975

(51) Int. Cl.
*H02P 27/08* (2006.01)
(52) U.S. Cl.
CPC .................................. *H02P 27/08* (2013.01)
(58) Field of Classification Search
CPC ....................................................... H02P 27/08
See application file for complete search history.

(56) References Cited

U.S. PATENT DOCUMENTS 5,625,545 A 4/1997 Hammond
10,141,865 B1 * 11/2018 Noman .................. H02M 7/49

2002/0085398 A1 * 7/2002 Bixel ...................... H02P 23/06
363/41
2015/0124506 A1 5/2015 Sahoo et al.
2016/0285362 A1 9/2016 Pillonnet
2017/0244325 A1 * 8/2017 Carralero .......... H02M 3/33546

FOREIGN PATENT DOCUMENTS

EP 3076535 10/2016
FR 3060238 6/2018
WO WO2012016062 2/2012

OTHER PUBLICATIONS

Search Report and Written Opinion for French Patent Application No. 1872975, dated Nov. 12, 2019, 8 pages.
English Language Machine Translation of French Patent Application Publication No. FR3060238, published on Jun. 15, 2018, 18 pages.

* cited by examiner

*Primary Examiner* — Muhammad S Islam
*Assistant Examiner* — Bradley R Brown
(74) *Attorney, Agent, or Firm* — Locke Lord LLP (57) ABSTRACT

A method for controlling a variable speed drive supplying power to an electric motor, the variable speed drive comprising a plurality of at least Ni low-voltage power cells connected in series, comprising:

upon reception of a speed command, determining a number Mi of cells sufficient to supply power to the motor at a target voltage V that is determined based on the speed command; and activating the Mi power cells from among the Ni power cells, and deactivating the Ni-Mi other power cells in order to supply power to the motor in accordance with the speed command.

16 Claims, 7 Drawing Sheets

MANAGEMENT OF THE NUMBER OF ACTIVE POWER CELLS OF A VARIABLE SPEED DRIVE

TECHNICAL FIELD OF THE INVENTION

The invention relates to the management of a variable speed drive responsible for supplying power to an electrical device, such as for example an electric motor.

PRIOR ART

In a power topology, a high voltage is supplied by a variable speed drive by placing a certain number of low-voltage converters in series (which are then called power cells). Controlling these power cells makes it possible to supply a voltage at several levels, or a multilevel voltage, each power cell adding a voltage that makes it possible to achieve successive voltage levels.

In accordance with European standards, low voltages are understood to mean voltages of between 0 and 1000 volts in AC voltage operation and between 0 and 1500 volts in DC voltage operation. High voltages are understood to mean voltages greater than 1000 volts in AC voltage operation and greater than 1500 volts in DC voltage operation.

The variable speed drive may for example comprise N power cells, N being greater than or equal to 1. When the variable speed drive supplies a three-phase power supply, it comprises 3*N power cells, N power cells being dedicated to each of the three phases.

In practice, it is often the case that the N power cells on each phase are not necessary to generate the required voltage.

Specifically, the voltage level to be applied to the motor is roughly proportional to the speed of the motor. At low speed, the voltage is therefore low in comparison with the maximum voltage that it is possible to deliver when the N power cells are active and at full power. Each of the N cells then delivers a low voltage, this still having a tendency to age the components of the power cell and to accentuate the effect of the imperfections in the power stage, and the operation of the power supply system is then suboptimal.

Furthermore, some applications require a continuous power supply. Thus, if one or more power cells are faulty, solutions for bypassing the defective power cell or power cells may be implemented.

Furthermore, when a high voltage is required at the output of the variable speed drive, in a configuration comprising N power cells, bypassing one of them causes a voltage level to drop, and the system then operates in degraded mode and is not able to supply a full voltage.

In order to overcome this drawback, there may be provision to define "N+1" or "N+2" configurations that consist in adding additional power cells that are not used during normal operation and that are put into operation when one or two power cells become faulty, such that the power supply system is always able to supply a full voltage.

There is thus a need to optimize the use of the power cells of a variable speed drive responsible for supplying power to an electrical device such as an electric motor.

The present invention solves the abovementioned drawbacks.

DISCLOSURE OF THE INVENTION

A first aspect of the invention relates to a method for controlling a variable speed drive supplying power to an electric motor, the variable speed drive comprising a plurality of at least $N_i$ low-voltage power cells connected in series for at least one phase of index i, the method comprising:

upon reception of a speed command, determining a number $M_i$ of cells sufficient to supply power to the motor at a target voltage V that is determined based on the speed command;

activating the $M_i$ power cells from among the $N_i$ power cells, and deactivating the $N_i - M_i$ other power cells in order to supply power to the motor in accordance with the speed command.

Thus, in contrast to the solutions from the prior art, the number of active power cells is not set, this having the advantage of being able to adapt the number of active power cells to the output voltage, supplied to the electric motor, of the variable speed drive. This has the advantages of reducing the losses of power cells, of improving the thermal state of the variable speed drive, of improving motor overvoltage protection and of reducing the impact of the imperfections of the power conversion stage on the targeted output voltage.

The $N_i$ power cells may correspond to a phase i of a three-phase power supply and the other phases may comprise the same number $N_i$ of power cells. As a variant, the numbers $N_i$ of power cells of the variable speed drive differ.

According to one embodiment, the variable speed drive comprises a plurality of phases, each phase of index j having $N_j$ power cells and the number $M_i$ for each phase of index i may be lower than the minimum of the values $N_j$ for j varying between 1 and the number of phases of the variable speed drive.

Such an embodiment makes it possible to ensure balanced voltages between the various phases of the variable speed drive.

In addition, each power cell may be able to supply an output voltage lower than a maximum value $V_{max}$, the method comprising determining the target output voltage V of the variable speed drive based on the speed command, and $M_i$ is such that $M_i * V_{max} \geq V$.

The number $M_i$ thus makes it possible to ensure delivering the desired output voltage.

In addition, $M_i$ may be the smallest integer such that $M_i * V_{max} \geq V$.

The minimum number of power cells required to supply the desired output voltage are thus activated, and the use of the variable speed drive is thus optimized.

According to one embodiment, prior to receiving the speed command, the method may comprise a preceding phase in which a number $K_i$ of power cells are active in order to supply power to the motor, $K_i$ being lower than or equal to $N_i$ and $K_i$ being other than $M_i$;

if $K_i$ is greater than $M_i$, $K_i - M_i$ power cells may be deactivated in order to supply power to the motor in accordance with the speed command;

if not, $M_i - K_i$ power cells are activated in order to supply power to the motor in accordance with the speed command.

This embodiment thus makes it possible to optimize the operation of the variable speed drive on the basis of the reception of a speed command.

According to one embodiment, if $|M_i - K_i| \geq 2$, the $|M_i - K_i|$ power cells may be activated/deactivated one after another.

Such successive and non-simultaneous activations/deactivations make it possible to gradually increase/decrease the voltage at the motor while minimizing overvoltage risks following switching of a switch in order to activate/deactivate a power cell.

According to one embodiment, the method may furthermore comprise transmitting control signals for the Mi active power cells and, for each active power cell, the control signal comprises orders to switch certain switches of an H-bridge of the power cell, and each control signal is generated from a triangular-wave signal and from a reference control voltage value.

In addition, according to a first embodiment, in the preceding phase, Ki triangular-wave signals that are phase-offset from one another by $2\pi/Ki$ are used to generate the respective control signals, equivalent to respective reference control voltage values $V^{ref}_t$, t varying between 1 and Ki.

Following the reception of the speed command, Mi triangular-wave signals that are phase-offset from one another by $2\pi/Mi$ are used to generate the respective control signals, equivalent to new respective reference control voltage values $V^{ref}_t$, t varying between 1 and Ki, the new values being determined based on the speed command.

The term "equivalent" means that each of the reference control voltage values is compared with one of the triangular-wave signals so as to determine the control signals that make it possible to switch the switches of an H-bridge of a power cell. Such a comparison will be understood better in the light of the explanations given below with reference to FIGS. 4 and 5.

The first embodiment makes it possible to adapt the number of active power cells to the required voltage, while at the same time minimizing the harmonic content of the voltage at the output of the variable speed drive.

As a variant, according to a second embodiment, if Ki is greater than Mi:

in the preceding phase, Ki triangular-wave signals that are phase-offset from one another by $2\pi/Ki$ are used to generate the respective control signals, equivalent to respective reference control voltage values $V^{ref}_t$, t varying between 1 and Ki;

following the reception of the speed command, Ki triangular-wave signals that are phase-offset from one another by $2\pi/Ki$ are used to generate the respective control signals, equivalent to new respective reference control voltage values $V^{ref}_t$, i varying between 1 and Ki, Ki–Mi new values $V^{ref}_t$ are set equal to zero. This is tantamount to deactivating Ki–Mi power cells by setting their duty cycles to zero.

The second embodiment is faster and easier to implement than the first embodiment, to the detriment of the quality of the voltage at the output of the variable speed drive.

According to one embodiment, the variable speed drive may comprise, for each power cell, a switch able to connect and disconnect the power cell of the series of power cells; the switch of an active power cell is open and the switch of an inactive power cell is closed.

The power cells may thus be deactivated and activated by way of a bypass switch.

According to one embodiment, the method may furthermore comprise selecting Mi power cells from among the Ni power cells on the basis of a given criterion, and activating the Mi selected power cells.

The use of the variable speed drive, and in particular of the power cells, is thus optimized.

In addition, each of the at least Ni power cells may be associated with a counter measuring an operating time of the power cell, and the given criterion may depend on the respective operating times of the power cells.

The ageing/operating times of the power cells are thus monitored according to the invention.

In addition, the Mi power cells may be selected so as to reduce a standard deviation between the operating times of the power cells.

Homogeneous ageing of the power cells, and therefore an increase in the service life of the variable speed drive, is thus ensured.

A second aspect of the invention relates to a computer program able to be executed by a processing unit and comprising instructions for implementing the steps of a method according to the first aspect of the invention when it is executed by the processing unit.

A third aspect of the invention relates to a device for controlling a variable speed drive supplying power to an electric motor, the variable speed drive comprising a plurality of at least Ni low-voltage power cells connected in series for at least one phase of index i, the control device comprising:

an interface configured so as to receive a speed command;

a processing unit configured so as to determine a number Mi of cells sufficient to supply power to the motor at a voltage that is determined based on the speed command;

Activation of the Mi power cells from among the Ni power cells, and deactivation of the Ni-Mi other power cells in order to supply power to the motor in accordance with the speed command.

According to one embodiment, the device may comprise a digital signal processor comprising the interface for receiving the speed command, the digital signal processor furthermore controlling a programmable printed circuit, respective outputs of the programmable printed circuit being connected to the Ni power cells, and control signals may be transmitted to control cells of the Mi active power cells.

BRIEF DESCRIPTION OF THE FIGURES

Merely by way of example, the embodiments of the invention will be described with reference to the drawings, in which.

DETAILED DESCRIPTION

Figure 1:
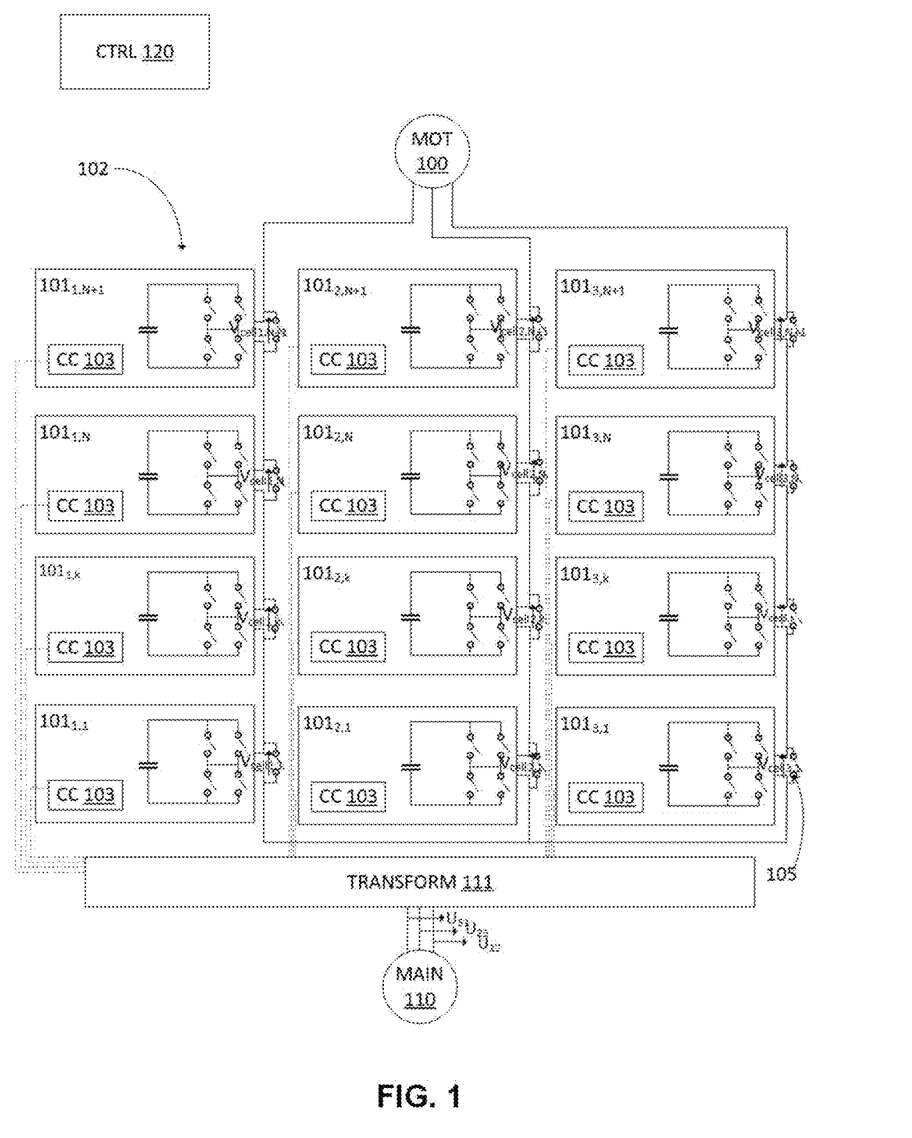
FIG. 1 illustrates a system for managing the supply of power to an electric motor according to one embodiment of the invention.

FIG. 1 shows a system for supplying power to an electric motor 100, such as for example an induction motor, supplied with power by a three-phase variable power supply. Such a motor is given by way of example but is not intended to restrict the invention to just this example, the invention being applicable to any motor supplied with power by a variable speed drive comprising a plurality of power cells.

A variable speed drive 102 comprises a transformer 111 receiving a three-phase variable power supply from the mains 110. The secondary of the transformer 111 is connected to a power stage. The transformer 111 may be a multi-coil transformer so as to deliver voltages to a plurality of power cells described below.

The power stage according to the invention may comprise one or more low-voltage power cells 101. In the example illustrated in FIG. 1, the motor receives a three-phase power supply and the power stage comprises 3*(N+1) power cells, with N+1 power cells dedicated to each phase, N being greater than or equal to 2.

With reference to FIG. 1, a system with 3*(N+1) power cells is shown, one power cell being reserved per phase in the event of failure of one of the active power cells. Such an example is given solely by way of illustration. Specifically, the invention also applies to a system with N power cells (or 3*N for a three-phase power supply), or to a system with N+2 (or more than N+2) power cells (or 3*(N+2) for a three-phase power supply). Furthermore, each phase i of a variable speed drive may comprise a number Ni of power cells, with different values of Ni, and the invention may be applied independently to each of the phases.

Each power cell 101 receives the three-phase power supply from one of the secondaries of the transformer 111 at input and may comprise a rectifier (not shown in FIG. 1) at input, the rectifier being able to rectify the received three-phase power supply so as to supply a DC voltage. The rectified DC voltage obtained for each power cell 101 is also called DC current bus voltage, DC or bus voltage. The rectifier may comprise a diode bridge, a thyristor bridge or any other known system for rectifying a voltage.

At the output of the rectifier, each power cell 101 may comprise a capacitor able to store electrical energy, and a voltage generation module receiving pulse width modulation (PWM) signals. Such a generation module may comprise an H-bridge comprising four switches that are controlled in pairs. A power electronics system using such a chopped voltage principle applies a voltage that is proportional to one or more rectified voltages, per phase, to the motor 100. The proportion that is applied corresponds on average to the ratio between the target voltage and the rectified reference voltage (defined below). The operation of an H-bridge is well known and will not be described further in the present application.

The switches of the H-bridge may be IGBT (for insulated-gate bipolar transistor) transistors, which have the advantage of being able to be switched rapidly.

The switches of a power cell 101 are controlled by a control cell 103 of the power cell 101.

The system furthermore comprises a control device 120 able to manage the supply of electric power to the motor 100. To this end, the control device 120 may control the monitoring cells 103 of the power cells 101. The control device 120 may furthermore control switches 105 for placing a subset of N+1 power cells in series for each phase. As a variant, these switches are controlled by the control device 120 by way of the monitoring cells 103.

The power cells 101 may receive control signals from the control device 120, on the basis of which the power cells 101 are able to control the switches of the H-bridge.

As a variant, the power cells 101 may receive reference voltages from the control device 120, on the basis of which the power cells 101 are able to determine the PWM proportion (the duty cycle) to be applied to the rectified voltage, and thus determine the commands to be sent to the switches of the H-bridge.

The three-phase voltages supplying power to the motor 100 are thus obtained by summing the output PWM voltages of the power cells 101 for which the switches 105 are open. A cell is said to be "active" when its switch 105 is open and when the duty cycle that it applies is not zero. A power cell for which the switch 105 is open but for which the duty cycle is zero may thus be considered to be deactivated. An active cell may thus be considered to be any power cell that delivers a nonzero voltage at output.

According to the prior art, the number of active power cells is set, and thus, in the case of a low voltage to be delivered to the motor 100, each power cell 101 supplies small voltage pulses.

The invention on the other hand proposes to determine the number of active power cells 101, from among the power cells of a phase, on the basis of the amplitude of the reference motor voltage received by the control device 120 (or determined by the control device 120 based on a speed command). The same number may be selected for the other phases. As a variant, different numbers of active cells may be selected for the various phases.

Figure 2A:
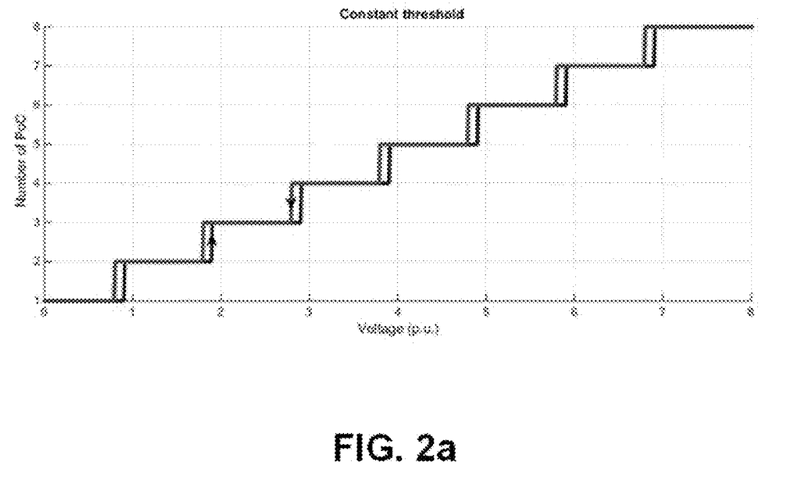
FIGS. 2a and 2b show the evolution of the number of active power cells as a function of the desired output voltage of the variable speed drive, and as a function of the output voltage of a power cell.

FIG. 2a illustrates the evolution of the number of active power cells 101 as a function of the amplitude of the reference motor voltage according to one embodiment of the invention.

The reference motor voltage is indicated in the command received by the control device 120. As a variant, the reference motor voltage may be corrected in order to take into account defects in the power stage.

It is noted in FIG. 2a that voltage threshold values may be used to decide whether to activate or to deactivate one or more power cells 101 of a given phase. As illustrated in FIG. 2a, the thresholds used to decrease the number of active cells may respectively be lower than the thresholds used to increase the number of active cells. Specifically, this makes it possible to reduce the number of activation/deactivation operations, thus reducing power losses, and thus optimizing the use of the power supply system. Furthermore, if a plurality of power cells are deactivated, they are deactivated one after another and not all simultaneously.

Furthermore, as the number of active cells is lower:
the thermal state of the variable speed drive 102 is improved; and
as each power cell 101 is imperfect, the impact of the imperfections of the power stage on the desired voltage at the motor 100 is reduced.

Figure 2B:
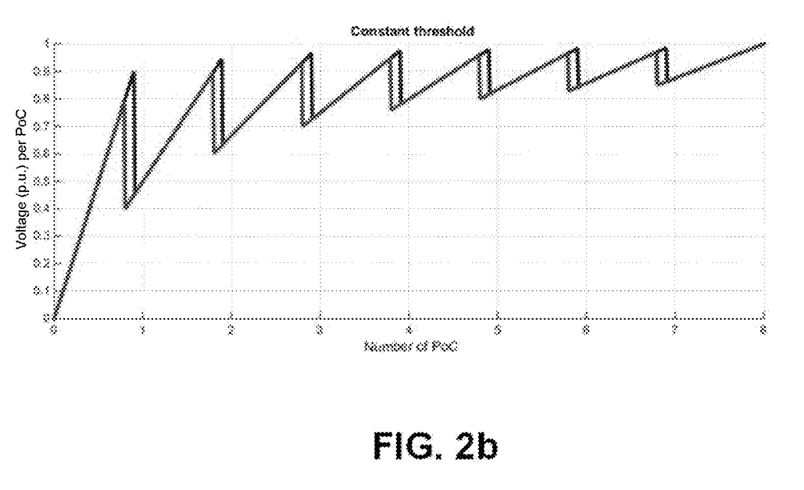

FIG. 2b illustrates the voltage delivered at the output of each power cell 101 as a function of the number of active power cells according to one embodiment of the invention.

In the solutions from the prior art in which the number of active power cells is set, the voltage delivered by each power cell 101 increases linearly with the motor reference voltage.

Figure 3:
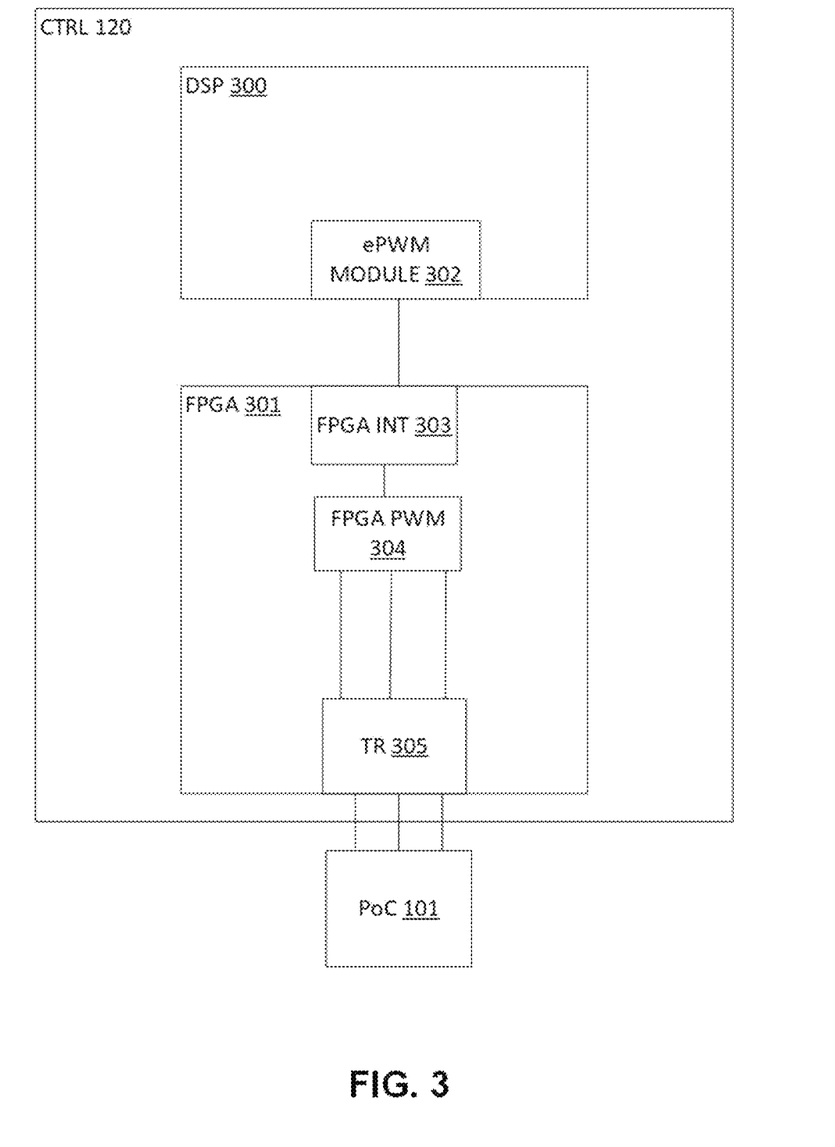
FIG. 3 illustrates the structure of a control device according to one embodiment of the invention.

FIG. 3 illustrates the structure of the control device 120 according to one embodiment of the invention.

The control device 120 comprises a processor 300 such as a digital signal processor (DSP), and a field-programmable gate array (FPGA) integrated circuit 301.

The processor 300 is configured so as to determine the motor reference voltages to be transmitted to the FPGA 301. In particular, the processor 300 comprises an ePWM module 302 configured so as to receive a first reference motor voltage at input, calculated beforehand by other components of the processor 300 that are not detailed in FIG. 3.

Based on the reference motor voltage, the ePWM module 302 is able to calculate control orders, such as PWM control orders. The control orders are generated by comparing triangular-wave signals and reference control voltages.

A PWM control signal resulting from the comparison of triangular-wave signals and of a reference control voltage is intended for each monitoring cell 103 of a power cell 101, in order to determine when the IGBT transistors of the H-bridge have to be switched, the power cell 101 thus supplying an output voltage in the form of PWM pulse width modulation pulses.

However, as the number of control signals corresponding to each IGBT becomes too great, according to one embodiment of the invention, an FPGA 301 may be inserted between the processor 300 and the power cells 101, and the control orders from the processor 300 are therefore not transmitted directly to the power cells 101.

In this case, the ePWM module 302 sends the reference voltages to the FPGA 301. This sending may be performed for example by way of PWM signals for which the duty cycles correspond to the voltages of the three phases of the motor. Without loss of generality, other communication means may be used.

Based on the reference motor voltage, the ePWM module 302 is able to calculate control orders, such as PWM control orders. The control orders are generated by comparing triangular-wave signals and reference control voltages.

The FPGA 301 may comprise an integration unit 303 at input, able to integrate the PWM signal sent by the ePWM module 302 in order to recover the reference motor voltages.

The modules 302 and 303 are optional and are used only if the processor 300 is initially designed to supply control orders directly to a limited number of power cells 101, and if the FPGA 301 is added at output according to embodiments of the invention, without having to change processor 300. However, the module 303 is not useful when the module 302 of the processor 300 is not present and when the processor 300 directly supplies a first reference motor voltage to the FPGA 301 without encoding the reference voltages through a PWM operation.

Thus, according to one embodiment without the modules 302 and 303, the reference motor voltage from the processor 300 is transmitted directly to a PWM command generation module 304 of the FPGA 301.

The module 304 takes, at input, a reference motor voltage, the rectified bus voltage of the power cells and, according to the invention, the number of active cells for a phase so as to generate PWM control orders for the monitoring cells 103 of the power cells 101. The control orders may be transmitted to the power cells 101 via a transmission module 305. There is no restriction attached to the transmission module, which may comprise a set of fibres for transporting the control signals with galvanic isolation.

The invention proposes to modify the number of active power cells 101 per phase on the basis of the reference motor voltage (from the integration unit 303 or directly from the processor 300, depending on the embodiment under consideration). The number of active power cells 101 per phase may be determined by the processor 300 or by the FPGA 301, for example from the curves shown in FIGS. 2a and 2b or more generally from a set of rules indicating a number of active power cells 101 for each voltage level in the acceleration or deceleration phase of the motor. Two embodiments presented below are provided for this purpose.

Figure 4:
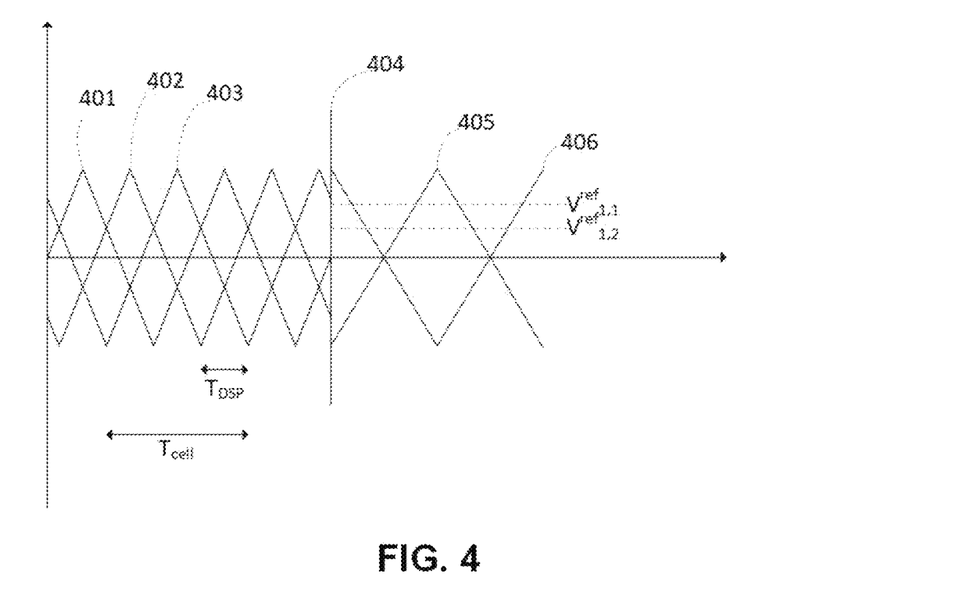
FIG. 4 illustrates the control signals delivered by the control device according to a first embodiment of the invention.

According to a first embodiment of the invention, illustrated with reference to FIG. 4, the change of the number of active power cells is synchronized between the processor 300 and the FPGA 301. FIG. 4 illustrates the control signals when changing from a configuration in which three power cells 101 are active to a configuration in which two power cells 101 are active, for a given phase, at the time 404. Such configurations of course depend on the situation and are given only by way of illustration. FIG. 4 corresponds to control signals for a single phase out of the three phases supplying power to the motor 100 in FIG. 1.

In the previous configuration with three active power cells 101, the triangular-wave signals 401, 402 and 403 are generated by the FPGA 301 for three power cells 101 of the first phase.

These triangular-wave signals are associated with respective reference control voltages $V^{ref}_{1,1}$, $V^{ref}_{1,2}$ and $V^{ref}_{1,3}$ in order to compare and generate PWM control orders to be sent to the power cells in question. The first indices "1" of the notations $V^{ref}_{1,1}$, $V^{ref}_{1,2}$ and $V^{ref}_{1,3}$ denote the first phase out of the three phases of the variable speed drive 102. The invention applies indiscriminately to the other phases.

The triangular-wave signals have a phase offset equal to $2\pi$ divided by the number of active cells, that is to say $2\pi/3$ in the example illustrated in FIG. 4. Such an offset makes it possible to avoid voltage spikes when the output voltages of the active power cells 101 are summed in order to supply power to the motor 100.

The period of the DSP 300 that supplies the triangular-wave signals at output then corresponds to one third of the period of a triangular-wave signal.

At the time 404, it is determined according to the invention that the number of active power cells 101 is reduced to 2. Such a determination may follow the reception of a new speed command and/or the calculation of a new reference motor voltage value, in particular with a value lower than a preceding value.

The frequency of the DSP 300 is then modified so as to be adapted to such a reduction. In the example under consideration, the period of the DSP 300 is multiplied by 1.5 (the frequency is therefore reduced by one third).

Two triangular-wave signals 405 and 406 are then generated by the unit 304 for the two active power cells 101.

The unit 304 furthermore calculates the new values of $V^{ref}_{1,1}$ and $V^{ref}_{1,2}$ corresponding to the triangular-wave signals 405 and 406. The new values $V^{ref}_{1,1}$ and $V^{ref}_{1,2}$ are calculated so as to supply the targeted output voltage in order to supply power to the motor 100. The value $V^{ref}_{1,3}$ is not calculated as the cell $101_{1,3}$ is deactivated after the time 404. The PWM control signals are then generated and transmitted to the two active power cells $101_{1,1}$ and $101_{1,2}$.

The first embodiment makes it possible to minimize the harmonic content of the signal at the output of the variable speed drive 102, and thus improves the quality of the signal.

Figure 5:
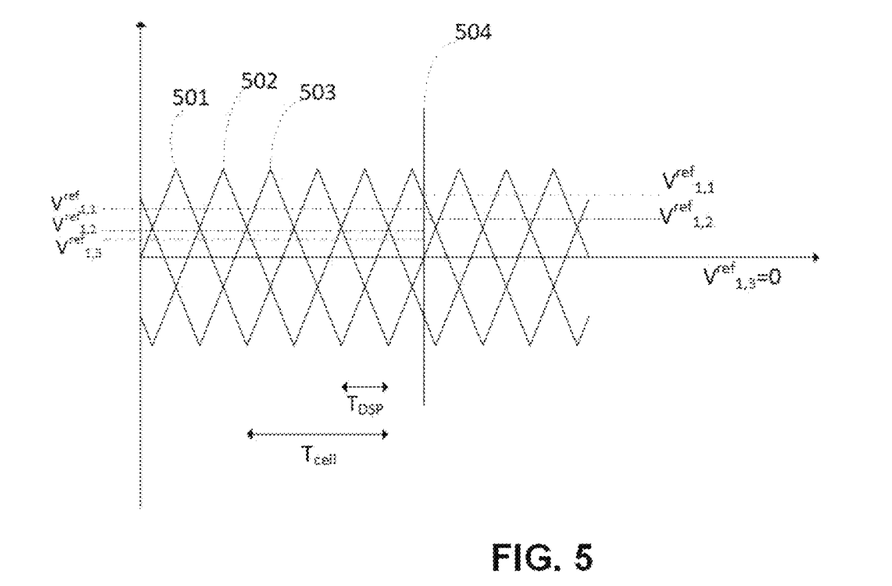
FIG. 5 illustrates the control signals delivered by the control device according to a second embodiment of the invention.

According to a second embodiment, only the FPGA 301 adapts its operation so as to reduce the number of active power cells 101, without this impacting the operation of the processor 300.

The FPGA 301, in a preceding phase, thus supplies the triangular-wave signals 501 to 503 associated respectively with respective reference control voltages $V^{ref}_{1,1}$, $V^{ref}_{1,2}$ and $V^{ref}_{1,3}$.

At the time 504, a modification of the number of active power cells 101 from three to two is determined, for example by virtue of receiving a new speed command and/or calculating a new reference motor voltage.

The period $T_{DSP}$ of the processor 300 is not modified and the triangular-wave signals thus remain offset by $2\pi/3$.

The FPGA 301 recalculates the values $V^{ref}_{1,1}$ and $V^{ref}_{1,2}$ so as to produce the target output voltage of the variable speed drive, and sets the value $V^{ref}_{1,3}$ to zero. The duty cycle applied by the power cell $101_{1,3}$ is therefore equal to 0, and the voltage at the output of this power cell $101_{1,3}$ is zero. The power cell $101_{1,3}$ may then be considered to be inactive. The second embodiment thus makes it possible to adapt the number of active power cells 101 without requiring synchronization between the processor 300 and the FPGA 301, and therefore without impacting the operation of the processor 300.

According to additional embodiments of the invention, when a cell or a plurality of power cells is or are deactivated, or when a power cell fails, the power cell or power cells 101 to be deactivated may be selected so as to manage the respective ageing/operating times of the power cells 101. The respective operating times of the power cells may be managed independently of the modification, presented above, of the number of active power cells in a variable speed drive.

Numerous scenarios arise.

First Case:

In the first case, the variable speed drive 102 comprises N power cells 101 per phase. When the calculated reference motor voltage or the speed command does not require using all of the power cells 101, the inactive power cells 101 may be selected depending on the respective ageing of the power cells 101. For example, each power cell 101 may comprise a counter that is activated when the power cell 101 is activated, and deactivated when the power cell 101 is deactivated, so as to measure the ageing of the power cell.

By way of example, if M active power cells 101 are required for a phase on the basis of the speed command or of the reference motor voltage, M being lower than N, the N−M power cells having the highest ageing are deactivated, thereby making it possible to homogenize the ageing of the power cells 101. More generally, the M power cells 101 to be activated are selected so as to reduce the standard deviation of the operating times/ageing of the power cells 101. Alternatively, the N−M power cells 101 having the lowest ageing are deactivated, thereby making it possible to force some of the power cells 101 to age, which will then be replaced with new power cells.

Second Case:

In the second case, the variable speed drive 102 comprises at least N+1 power cells 101 per phase, thus with at least one replacement power cell in order to overcome a fault with or the failure of an active power cell 101.

When N power cells 101 per phase are necessary due to the reference motor voltage, the motor control voltage or the speed command (operation at full power or nearly full power), the replacement power cell, which is inactive, may be selected depending on the respective ageing of the power cells, as discussed for the first case. The replacement power cell is thus not set.

Likewise, when M active power cells per phase are required on the basis of the reference motor voltage, of the motor control voltage or of the speed command, M being lower than N, the N−M+1 power cells having the highest ageing are deactivated, thereby making it possible to homogenize the ageing of the power cells 101. More generally, the M power cells to be activated are selected so as to reduce the standard deviation of the operating times/ageing of the power cells 101. Alternatively, the N−M+1 power cells having the lowest ageing are deactivated, thereby making it possible to force the other power cells 101 to age, which will then be replaced with new power cells.

Third Case:

In the third case, the variable speed drive 102 comprises N power cells 101 per phase, and a failure or a fault occurs on one of the power cells 101.

In this case, the faulty power cell 101 is deactivated, and the control device 120 controls the variable speed drive with a configuration with N−1 power cells, therefore by activating between 0 and N−1 power cells 101 on the basis of the reference motor voltage. In other words, the control device 120 reduces the maximum voltage that is able to be supplied by the variable speed drive 102.

Fourth Case:

In the fourth case, it is considered that the variable speed drive 102 comprises a number Ni of power cells 101 per phase, i being a phase index (being able to vary between 1 and 3 in the case of a three-phase variable speed drive for example).

In the event of a fault on a power cell of a phase i, the configuration of the branch i of the variable speed drive is reduced by 1.

The maximum voltage that is able to be achieved while at the same time retaining a balance between the phases thus corresponds to the minimum from among the maximum values able to be achieved for each of the phases.

VmaxVariateur is defined as such a maximum voltage, and is equal to min(Ni*Vmax), mino being the minimum function when the index i varies, and Vmax being the maximum voltage that a power cell is able to supply.

On the basis of the reference motor voltage or of the speed command, a minimum number of power cells required per phase Li is determined, Li being able to vary between 1 and min(Ni).

Thus, for each phase i, a voltage may be applied to the motor by activating a number Mi of power cells between Li and Ni, Mi being able to be different per phase.

There may thus be provision to activate more power cells than the number Li that is necessary at least to produce the reference motor voltage or the speed command, thereby potentially making it possible to implement a selective ageing strategy for the power cells. The choice of the value Mi for each phase may thus depend on an ageing criterion for the power cells, or on any other predefined criterion.

Figure 6:
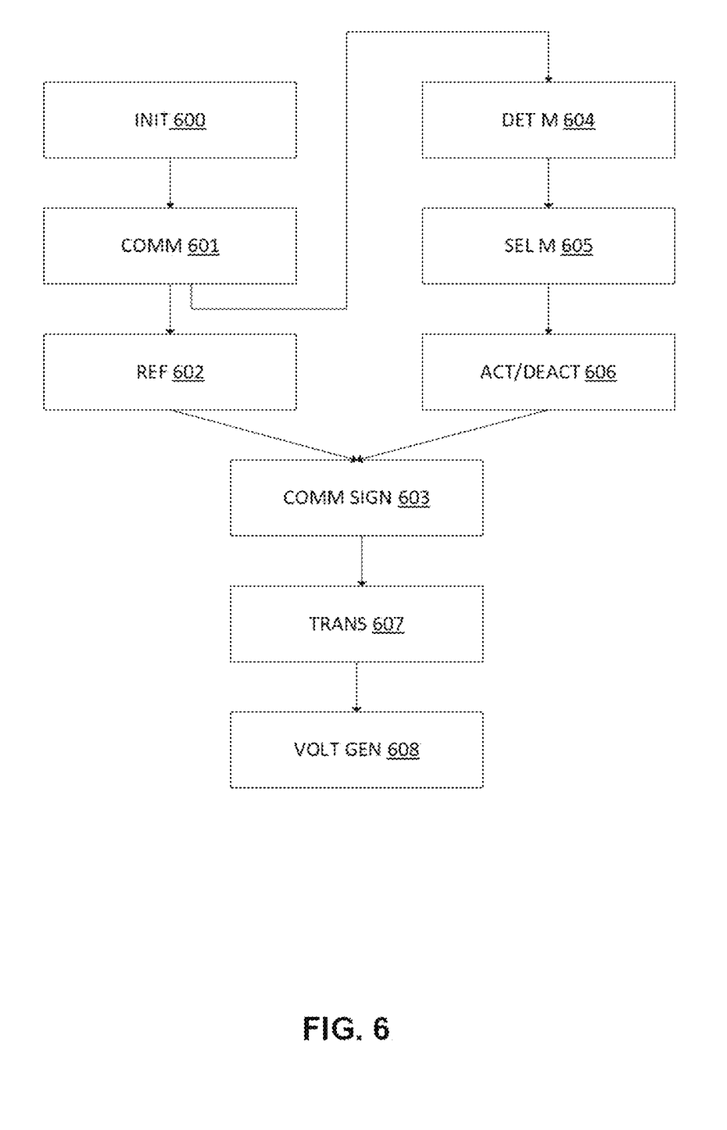
FIG. 6 is a diagram illustrating the steps of a method according to one embodiment of the invention.

FIG. 6 is a diagram illustrating the steps of a method according to one embodiment of the invention. It will be understood that the disclosure relates to a given phase from among potentially a plurality of phases.

In a step 600, in a preceding phase, K power cells 101 of the variable speed drive 102 are active and N−K power cells 101 are inactive. Such a configuration may be adopted following the reception of a preceding speed command and the processing of the speed command by the processor 300 and the FPGA 301.

In a step 601, the processor 300 receives a new speed command and processes the speed command so as to deduce a first reference motor voltage therefrom.

In a step 602, either the first reference motor voltage that is obtained is transmitted directly to the module 304 of the FPGA, or it is processed by the modules 302 and 303 so as to obtain the second reference motor voltage that is transmitted to the module 304 of the FPGA. In one embodiment comprising the modules 302 and 303, the processor 300 furthermore determines a number M of power cells to be activated, and the frequency of the processor 300 is modified so as to supply triangular-wave signals depending on the number M, in accordance with FIG. 4.

Control signals are then determined in a step 603, as described above.

Beforehand, and in parallel, a number M of power cells to be activated has been determined in a step 604, as described above, on the basis of the speed command (or of voltages derived from the speed command). In an optional step 605, M power cells from among N or N+1 (or more) are selected, on the basis of a given criterion. In this case, the control signals are preferably generated for the M selected power cells.

A plurality of numbers Mi may be selected for a plurality of phases of indices i of the variable speed drive, each phase of index i comprising Ni power cells. The number Mi is then between Ki and Ni as described above.

M power cells are then activated (or remain in their active state) and N–M power cells are deactivated in a step 606. Bypass switches 105 specifically for this purpose may be provided for the power cells, and the switches are closed for the deactivated power cells and opened for the active cells. As a variant, a power cell may be deactivated by applying a duty cycle of zero thereto, even though its bypass switch 105 may be open.

The control signals are then transmitted, in a step 607, to the control cells 103 of the power cells 101 (for example of the M active power cells 101).

In a step 608, the active power cells 101 generate respective output voltages on the basis of the received control signals, so as to produce the reference motor voltage.

Although the present invention has been described above with reference to particular embodiments, the invention is in no way limited to the described forms. The invention is limited only by that which is defined in the claims, and embodiments other than those described above may fall within the scope of the claims.

Furthermore, although the embodiments have been described above as a combination of components and/or functions, it will be readily understood that alternative embodiments may be obtained by other combinations of components and/or functions without however departing from the scope of the invention.

The invention claimed is:

1. Method for controlling a variable speed drive supplying power to an electric motor, the variable speed drive comprising a plurality of at least Ni low-voltage power cells connected in series for at least one phase of index i, comprising:
    upon reception of a speed command, determining a number Mi of power cells sufficient to supply power to the motor at a target output voltage V that is determined based on the speed command;
    activating the Mi power cells from among the Ni power cells;
    transmitting a control signal to a control cell of each of the Mi active power cells of the phase i, wherein, for each of the Mi active power cells, the control signal is generated from a triangular-wave signal, and Mi triangular-wave signals are phase-offset from one another by $2\pi/Mi$ to generate the respective control signals of the Mi active power cells;
    deactivating the Ni–Mi other power cells in order to supply power to the motor in accordance with the speed command; and
    reducing the number of active power cells below Mi when the target output voltage V drops below a respective deactivation threshold voltage value, and increasing the number of active power cells to above Mi when the target output voltage V rises above a respective activation threshold voltage value, wherein the deactivation threshold voltage value is lower than the activation threshold voltage value.

2. Method according to claim 1, wherein the variable speed drive comprises a plurality of phases, each phase of index j having Nj power cells;
    wherein the number Mi for a phase of index i is lower than the minimum of the values Nj for j varying between 1 and the number of phases of the variable speed drive.

3. Method according to claim 1, wherein each power cell is able to supply an output voltage lower than a maximum value $V_{max}$,
    the method comprising determining the target output voltage V of the variable speed drive based on the speed command,
    wherein Mi is such that $Mi*V_{max} \geq V$.

4. Method according to claim 3, wherein Mi is the smallest integer such that $Mi*V_{max} \geq V$.

5. Method according to claim 1, wherein, prior to receiving the speed command, the method comprises a preceding phase in which a number Ki of power cells are active in order to supply power to the motor, Ki being lower than or equal to Ni and Ki being other than Mi;
    wherein, if Ki is greater than Mi, Ki–Mi power cells are deactivated in order to supply power to the motor in accordance with the speed command;
    if not, Mi–Ki power cells are activated in order to supply power to the motor in accordance with the speed command.

6. Method according to claim 5, wherein, if $|Mi-Ki| \geq 2$, the $|Mi-Ki|$ power cells are activated/deactivated one after another.

7. Method according to claim 1, wherein, for each active power cell, the control signal comprises orders to switch certain switches of an H-bridge of the power cell, and wherein each control signal is generated from a triangular-wave signal and from a reference control voltage value.

8. Method according to claim 5, wherein, in the preceding phase, Ki triangular-wave signals that are phase-offset from one another by $2\pi/Ki$ are used to generate the respective control signals, equivalent to respective reference control voltage values $V^{ref}_t$, t varying between 1 and Ki; and
    wherein, following the reception of the speed command, the Mi triangular-wave signals that are phase-offset from one another by $2\pi/Mi$ are used to generate the respective control signals, equivalent to new respective reference control voltage values $V^{ref}_t$, t varying between 1 and Mi, the new values being determined based on the speed command.

9. Method according to claim 5, wherein, if Ki is greater than Mi,
    in the preceding phase, Ki triangular-wave signals that are phase-offset from one another by $2\pi/Ki$ are used to generate the respective control signals, equivalent to respective reference control voltage values $V^{ref}_t$, t varying between 1 and Ki; and
    wherein, following the reception of the speed command, Ki triangular-wave signals that are phase-offset from one another by $2\pi/Ki$ are used to generate the respective control signals, equivalent to new respective reference control voltage values $V^{ref}_t$, i varying between 1 and Ki, the new values being determined based on the speed command, and wherein Ki–Mi new values $V^{ref}_t$ are set equal to zero.

10. Method according to claim 1, wherein the variable speed drive comprises, for each power cell, a switch able to connect and disconnect the power cell of the series of power cells,
    wherein the switch of an active power cell is open and the switch of an inactive power cell is closed.

11. Method according to claim 1, furthermore comprising selecting Mi power cells from among the Ni power cells on the basis of a given criterion, and activating the Mi selected power cells.

12. Method according to claim 11, wherein each of the at least Ni power cells is associated with a counter measuring an operating time of the power cell, and wherein the given criterion depends on the respective operating times of the power cells.

13. Method according to claim 12, wherein the Mi power cells are selected so as to reduce a standard deviation between the given criterion, which may depend on the operating time of the power cells.

14. Computer program product comprising a non-transitory processor readable medium having processor readable instructions stored thereon, which when executed by a processor, cause the processor to implement the method according to claim 1.

15. Device for controlling a variable speed drive supplying power to an electric motor, the variable speed drive comprising a plurality of at least Ni low-voltage power cells connected in series for at least one phase of index i, the control device comprising:
   an interface configured to receive a speed command; and
   a processing unit configured to determine a number Mi of power cells sufficient to supply power to the motor at a target output voltage that is determined based on the speed command and to activate Mi power cells from among the Ni power cells, and deactivate Ni-Mi other power cells in order to supply power to the motor in accordance with the speed command;
   wherein the processing unit is further configured to transmit a control signal to a control cell of each of the Mi active power cells of the phase i, wherein, for each of the Mi active power cells, the control signal is generated from a triangular-wave signal, and Mi triangular-wave signals are phase-offset from one another by $2\pi/Mi$ to generate the respective control signals of the Mi active power cells; and
   wherein the processing unit is further configured reduce the number of active power cells below Mi when the target output voltage drops below a deactivation threshold voltage value, and increase the number of active power cells to above Mi when the target output voltage rises above an activation threshold voltage value, wherein the deactivation threshold voltage value is lower than the activation threshold voltage value.

16. Control device according to claim 15, comprising a digital signal processor comprising the interface configured to receive the speed command, the digital signal processor furthermore controlling a programmable printed circuit, respective outputs of the programmable printed circuit being connected to the Ni power cells,
   wherein control signals are transmitted to control cells of the Mi active power cells.

* * * * *